United States Patent [19]

Mark et al.

[11] 4,403,054

[45] Sep. 6, 1983

[54] STABILIZED POLYCARBONATE COMPOSITIONS

[75] Inventors: Victor Mark, Evansville; John A. Tyrell, Mt. Vernon, both of Ind.

[73] Assignee: General Electric Company, Mt. Vernon, Ind.

[21] Appl. No.: 296,555

[22] Filed: Aug. 26, 1981

[51] Int. Cl.³ .......................... C08K 5/41; C08K 5/45; C08L 69/00
[52] U.S. Cl. .................................... 524/155; 524/82; 524/84; 524/173; 525/462; 525/537
[58] Field of Search ................. 524/84, 155, 173, 82; 525/462, 470, 535, 537

[56] References Cited

U.S. PATENT DOCUMENTS

| | | | |
|---|---|---|---|
| 3,462,391 | 8/1969 | Stewart | 524/155 |
| 4,046,836 | 9/1977 | Adelmann et al. | 525/462 |
| 4,081,495 | 3/1978 | Freitag et al. | 264/130 |
| 4,195,157 | 3/1980 | Mark | 525/470 |
| 4,290,934 | 9/1981 | Mark | 260/30.8 R |
| 4,303,759 | 12/1981 | Dixon et al. | 524/170 |
| 4,362,829 | 12/1982 | Cooper et al. | 524/84 |

*Primary Examiner*—John Kight, III
*Assistant Examiner*—R. A. White
*Attorney, Agent, or Firm*—Martin B. Barancik

[57] ABSTRACT

A composition comprising an aromatic carbonate polymer in admixture with an effective thermal stabilizing amount of a sulfoxide compound or a sulfinyl containing polymer.

10 Claims, No Drawings

STABILIZED POLYCARBONATE COMPOSITIONS

BACKGROUND OF THE INVENTION

Stabilizers of aromatic carbonate polymers have long been known in the art. Of particular interest is the concept of thermal stabilization of aromatic carbonate polymers.

General injection molding of these polymers exposes the material to high temperatures. In addition many of the utilities of the polymers require long term exposure to elevated temperatures. The integrity of the molecule should be retained for as long as possible since the physical characteristics are dependent thereon. Various chemicals such as phosphites and phosphonites have been in common usage as thermal stabilizers for aromatic carbonate polymers.

A new class of thermal stabilizers for aromatic carbonate polymers has been discovered.

SUMMARY OF THE INVENTION

In accordance with the invention there is a composition which comprises an aromatic carbonate polymer in admixture with an effective amount of (a) a thermally stabilizing compound of the formula

FIG. 1 wherein X and Y are the same or different and are alkyl of one to six carbon atoms, inclusive; alkenyl of two to six carbon atoms, inclusive; phenyl; phenyl substituted with one to three members of the group consisting of alkyl of one to three carbon atoms, inclusive, alkoxy of one to three carbon atoms, inclusive, chlorine and bromine; phenyl substituted alkyl of one to six carbon atoms, inclusive, the phenyl unsubstituted or substituted with one to three members of the group consisting of alkyl of one to three carbon atoms, inclusive, alkoxy of one to three carbon atoms, inclusive, chlorine and bromine; and X and Y, when taken together with the sulfur atom to which they are attached, is alkylene of four to eight carbon atoms, inclusive; unsubstituted or substituted with benzo or one to three members of the group consisting of alkyl of one to six carbon atoms, inclusive;
alkenyl of two to six carbon atoms, inclusive;
phenyl;
phenyl substituted with one to three members of the group consisting of alkyl of one to three carbon atoms, inclusive; alkoxy of one to three carbon atoms, inclusive, chlorine or bromine; or (b) a thermally stabilizing polymer containing a sulfinyl group.

A preferred group of compounds is where X is benzyl.

Another preferred group of compounds is where X is alkenyl of two to six carbon atoms, inclusive.

Preferred compounds are dibenzyl sulfoxide and phenyl vinyl sulfoxide.

DETAILED DESCRIPTION OF THE INVENTION

As used in this specification and claims the phrase "alkyl of one to six carbon atoms, inclusive" includes methyl, ethyl, n-propyl, n-butyl, n-pentyl, n-hexyl and isomers thereof such as isopropyl, tert butyl, neopentyl, 2,2-dimethylbutyl and 1,1-dimethylbutyl. The phrase "alkenyl of two to six carbon atoms, inclusive" includes vinyl, 2-propenyl, 3-pentenyl, 1-hexenyl and isomers thereof. The phrase "phenyl substituted alkyl of one to six carbon atoms, the phenyl unsubstituted or substituted with one to three members of the group consisting of alkyl of one to three carbon atoms, inclusive, chlorine and bromine" includes benzyl; 1-phenethyl; 2-phenethyl; 4-phenylbutyl; 2-methyl-3-phenyl butyl; 3(o-tolyl)propyl; 4(2-chloro-4-ethylphenyl)butyl. The phrase "phenyl substituted with one to three members of the group consisting of alkyl of one to three carbon atoms, inclusive, alkoxy of one to three carbon atoms, inclusive, chlorine and bromine" includes 2-tolyl; 2,4-dimethylphenyl; o-cumyl; 2-methoxyphenyl; 2-ethoxy-3-ethylphenyl; 2,4,6-trichlorophenyl; and 2-methyl-4-propoxy-5-bromophenyl. The phrase "X and Y, when taken together with the sulfur atom to which they are attached" includes butylene $-(CH_2)_4-$, hexylene $-(CH_2)_6-$, octylene $-(CH_2)_8-$, and substituted molecules thereof such as

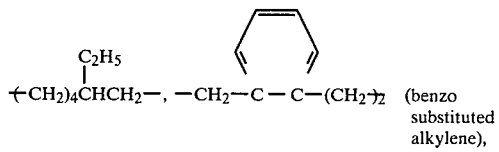

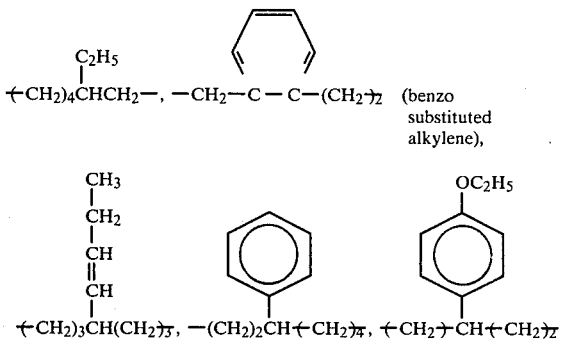

The polymer, to which an effective amount of the thermally stabilizing sulfoxide of FIG. 1 or additive polymer is added, is prepared in the conventional manner by an interfacial polymerization process or a transesterification process. The process materials will be illustrated with the reactants commonly employed in the interfacial polymerization process although it is to be understood that suitable reactants can be employed in the transesterification process to provide the same aromatic carbonate polymer.

Typical of some of the dihydric phenols that may be employed in the practice of this invention are bisphenol-A, (2,2-bis(4-hydroxyphenyl)propane), 2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxydiphenyl)methane, bis(4-hydroxy phenyl)sulfone and bis(4-hydroxy phenyl)sulfide. Other dihydric phenols of the bisphenol type are also available and are disclosed in U.S. Pat. Nos. 2,999,835; 3,028,365 and 3,334,154. Bisphenol-A is preferred.

It is of course possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di(tribromophenyl)carbonate, etc., di-(alkylphenyl)carbonate such as di(tolyl)carbonate, etc., di-(naphthyl)carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols such as BPA and hydroquinone, or glycols (bishaloformates of ethylene glycol, neopentyl glycol, polyethylene glycol, etc.). While other carbonate precursors will occur to those skilled in the art, carbonyl chloride, also known as phosgene, is preferred.

The polymers of this invention may be prepared by employing a molecular weight regulator, an acid acceptor and a catalyst. The molecular weight regulators which can be employed in carrying out the process of this invention include monohydric phenols such as phenol, chroman-1, paratertiarybutylphenol, parabromophenol, etc. Commonly, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor includes a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polymer and a branched polymer.

Also included within the definition of aromatic carbonate polymer are so-called copolyester carbonates. These compounds have both ester ($CO_2$) and carbonate ($CO_3$) repeating units. These compounds are generally prepared from the reaction of dihydric phenols dicarboxylic acid precursors and a carbonate precursor. The preferred aromatic carbonate polymers are synthesized from bisphenol-A, terephthaloyl dichloride, isophthaloyl dichloride, and phosgene.

The sulfoxides of FIG. 1 are made by conventional methods generally known to those of skill in the art. A significant number of the sulfoxides may be purchased commercially. Sulfoxides can in general be prepared in the following manner. The sulfide of the FIG. 1 compounds is oxidized to the sulfoxide by conventional reagents such as hydrogen peroxide or peracids. The sulfide is often commercially available or can be prepared by reacting a YSH compound with an X—W compound wherein W is a leaving group, generally a halogen such as chlorine.

The additive polymers useful in the invention are prepared by selective oxidation of the corresponding sulfide containing polymer. The polymeric sulfides are prepared in the same manner as the sulfides of the FIG. 1 compound.

Illustrative examples of sulfoxides and additive polymers which are useful as thermal stabilizers of aromatic carbonate polymers are disclosed in the Chart, attached to the specification. X and Y are the same variables as in FIG. 1.

A thermal stabilizing effective amount of the sulfoxide of FIG. 1 or additive polymer is added to the aromatic carbonate polymer. A "thermal stabilizing effective amount" is a quantity of the sulfoxide which inhibits the deterioration of the aromatic carbonate polymer when it is subjected to a thermal treatment. Such deterioration is measured by conventional parameters such as intrinsic viscosity (I.V.) upon heating. A control aromatic carbonate without any sulfoxide or additive polymer is employed as the comparison base. In order to be an effective amount, the quantity of sulfoxide or additive polymer employed should not cause significant deterioration of the subject polymer and be physically compatible with it. Generally, quantities of sulfoxide or additive polymer of from about 0.005 to about 5 weight percent based on the quantity of aromatic carbonate polymer, preferably 0.01 to about 0.5 weight percent are appropriate.

It is preferred that the additive remains physically present during the processing of the polymer. Although the boiling point of the additive may be significantly lower than the processing temperature, the bulk of the additive may stay within the polymer during processing because of its intermingling with the polymer below the surface of the flowing material. It is important that the quantity of additive present in the polymer during and after the thermal processing produces a thermal stabilizing effect.

The sulfoxide or additive polymer is added to the aromatic carbonate polymer in the conventional manner, the example by co-extruding with dry resin or by adding the sulfoxide or additive polymer to the solution or melt.

Below are specific examples of the invention. These examples are intended to illustrate but not to limit the concept of the invention.

EXAMPLE 1

Polycarbonate prepared from BPA and diphenyl carbonate in a transesterification process, and having an intrinsic viscosity of 0.455 was aged for 16 hours at 250° C. The I.V. dropped to 0.251. Coextrusion of this polycarbonate with 0.07% dibenzyl sulfoxide gave a stabilized polycarbonate of 0.468 I.V. After aging for 16 hours at 250° C. the I.V. was 0.433.

EXAMPLE 2

Polycarbonate prepared from BPA and diphenyl carbonate in a transesterification process, and having an intrinsic viscosity of 0.455 was aged for 16 hours at 250° C. The I.V. dropped to 0.251. Coextrusion of this polycarbonate with 0.07% phenylvinylsulfoxide gave a stabilized polycarbonate of 0.451 I.V. After aging for 16 hours at 250° C. the I.V. was 0.405.

EXAMPLE 3

In like manner as in Example 1 and 2 appropriate quantities of phenyl benzyl sulfoxide, benzyl ethyl sulfoxide, p-tolyl benzyl sulfoxide, phenyl alkyl sulfoxide, dibutyl sulfoxide, diphenyl sulfoxide, benzyl sulfoxide polymer are added to the aromatic carbonate polymer and similar results are obtained.

CHART

| X | Y |
| --- | --- |
| phenyl | benzyl |
| n-propyl | n-butyl |
| allyl | t-butyl |
| phenyl | methyl |
| 3-chlorophenyl | isobutyl |
| 4-ethylphenyl | 1-phenethyl |
| 2,5-dimethylphenyl | i-propyl |
| 3,4-dimethoxybenzyl | n-hexyl |
| 2-bromophenyl | benzyl |
| 2-bromo-4,5-dimethylphenyl | ethyl |
| vinyl | 2-phenethyl |
| 2-butenyl | neopentyl |
| n-butyl | 3-propyl-2-ethyl-4-bromophenyl |

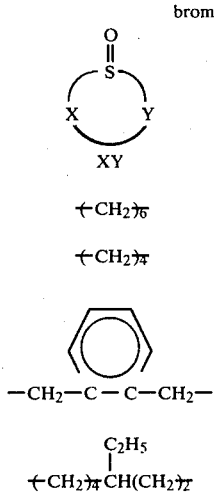

CHART -continued

| X | Y |
| --- | --- |

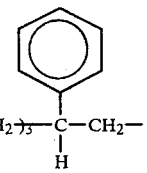

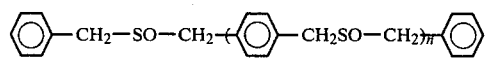

Polymers containing a sulfinyl group

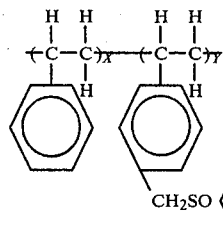

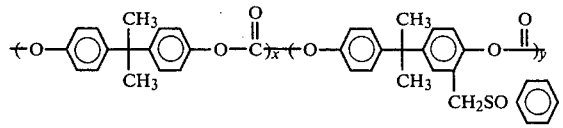

wherein X and Y are integers of sufficient size to make a polymer.

What is claimed is:

1. A composition which comprises an aromatic carbonate polymer in admixture with an effective amount of a stabilizer of the group consisting of (a) thermal stabilizing compound of the formula $$X-\overset{O}{\underset{\|}{S}}-Y \qquad \text{FIG. 1}$$

wherein

X and Y are the same or different and are alkyl of one to six carbon atoms inclusive; alkenyl of two to six carbon atoms, inclusive; phenyl; phenyl substituted with one to three members of the group consisting of alkyl of one to three carbon atoms, inclusive, alkoxy of one to three carbon atoms, inclusive, chlorine and bromine; phenyl substituted alkyl of one to six carbon atoms, inclusive, the phenyl unsubstituted or substituted with one to three members of the group consisting of alkyl of one to three carbon atoms, inclusive, alkoxy of one to three carbon atoms, inclusive, chlorine and bromine; and X and Y, when taken together with the sulfur atom to which they are attached, is alkylene of four to eight carbon atoms, inclusive; unsubstituted or substituted with benzo or one to three members of the group consisting of alkyl of one to six carbon atoms, inclusive;
alkenyl of two to six carbon atoms, inclusive; phenyl;
phenyl substituted with one to three members of the group consisting of alkyl of one to three carbon atoms, inclusive; alkoxy of one to three carbon atoms, inclusive, chlorine or bromine; or (b) a thermal stabilizing polymer containing a sulfinyl group.

2. A composition in accordance with claim 1 wherein the stabilizer is a compound of FIG. 1 and X is benzyl.

3. A composition in accordance with claim 1 wherein the stabilizer is a compound of FIG. 1 and Y is alkenyl of two to six carbon atoms, inclusive.

4. A composition in accordance with claim 2 wherein Y is benzyl.

5. A composition in accordance with claim 1 wherein the stabilizer is a compound of FIG. 1 and X is phenyl and Y is alkenyl of two carbon atoms.

6. A composition in accordance with claims 2 or 3 wherein a compound of FIG. 1 is present in the admixture in quantities of from about 0.005 to about 5 weight percent of the aromatic carbonate polymer.

7. A composition in accordance with claim 2 or 3 wherein a compound of FIG. 1 is present in the admixture in quantities of from about 0.01 to about 0.5 weight percent of the aromatic carbonate polymer.

8. A composition in accordance with claim 1 wherein the compound of FIG. 1 or additive polymer is present in the admixture in quantities of from about 0.01 to about 0.5 weight percent of the aromatic carbonate polymer.

9. A composition in accordance with claim 1 wherein the compound of FIG. 1 or additive polymer is present in the admixture in quantities of from about 0.005 to about 5 weight percent of the aromatic carbonate polymer.

10. A composition in accordance with claim 1 wherein the aromatic carbonate polymer is derived from bisphenol-A and a carbonate precursor.

* * * * *